United States Patent
Liu et al.

(10) Patent No.: US 11,003,780 B2
(45) Date of Patent: May 11, 2021

(54) METHOD AND APPARATUS FOR VALIDATING BIOS FIRMWARE USING A BASEBOARD MANAGEMENT CONTROLLER

(71) Applicant: DELL PRODUCTS, LP, Round Rock, TX (US)

(72) Inventors: Wei Liu, Austin, TX (US); Juan F. Diaz, Round Rock, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 16/054,872

(22) Filed: Aug. 3, 2018

(65) Prior Publication Data
US 2020/0042710 A1  Feb. 6, 2020

(51) Int. Cl.
  G06F 21/57 (2013.01)
  G06F 9/445 (2018.01)
  G06F 8/654 (2018.01)

(52) U.S. Cl.
  CPC .......... G06F 21/575 (2013.01); G06F 8/654 (2018.02); G06F 9/44505 (2013.01)

(58) Field of Classification Search
  CPC combination set(s) only.
  See application file for complete search history.

(56) References Cited

U.S. PATENT DOCUMENTS

| | | | |
|---|---|---|---|
| 8,918,652 B2 | 12/2014 | Pant et al. | |
| 9,047,452 B2 | 6/2015 | Dailey et al. | |
| 10,467,015 B2 * | 11/2019 | Dasar | G06F 9/4401 |
| 2002/0004905 A1 | 1/2002 | Davis et al. | |
| 2008/0022108 A1 * | 1/2008 | Brannock | G06F 21/72 713/176 |
| 2011/0010584 A1 * | 1/2011 | Kochar | G06F 11/2041 714/32 |
| 2011/0119474 A1 * | 5/2011 | Singh | G06F 8/65 713/2 |
| 2013/0138934 A1 * | 5/2013 | Lin | G06F 9/4411 713/1 |
| 2013/0254527 A1 * | 9/2013 | Zhang | G06F 9/4401 713/100 |
| 2013/0339713 A1 * | 12/2013 | Huang | G06F 21/572 713/2 |
| 2014/0047224 A1 * | 2/2014 | Ayanam | G06F 8/654 713/1 |
| 2014/0068275 A1 * | 3/2014 | Swanson | G06F 21/575 713/192 |
| 2015/0355911 A1 * | 12/2015 | Bibb, Jr. | G06F 21/572 713/2 |
| 2016/0004526 A1 * | 1/2016 | Hsu | G06F 1/266 713/100 |
| 2016/0098283 A1 * | 4/2016 | Martinez | G06F 9/44505 713/2 |
| 2016/0147996 A1 | 5/2016 | Martinez | |

(Continued)

*Primary Examiner* — Raymond N Phan

(74) *Attorney, Agent, or Firm* — Larson Newman, LLP

(57) ABSTRACT

A method includes storing basic input/output system (BIOS) firmware instructions at a first flash memory device included at an information handling system. The BIOS firmware includes an initial boot block. BIOS data is stored at a second flash memory device. A baseboard management controller validates instructions included at the initial boot block.

18 Claims, 6 Drawing Sheets

(56) References Cited

U.S. PATENT DOCUMENTS

| | | | |
|---|---|---|---|
| 2017/0012770 A1* | 1/2017 | Lin | G06F 21/572 |
| 2017/0085383 A1* | 3/2017 | Rao | G06F 8/654 |
| 2017/0109531 A1* | 4/2017 | Wang | G06F 21/572 |
| 2017/0235928 A1* | 8/2017 | Desai | G06F 21/105 |
| | | | 713/2 |
| 2018/0096154 A1* | 4/2018 | Shivanna | G06F 21/572 |
| 2018/0349604 A1* | 12/2018 | Khatri | G06F 21/566 |
| 2019/0065210 A1* | 2/2019 | Han | G06F 9/4401 |

\* cited by examiner

METHOD AND APPARATUS FOR VALIDATING BIOS FIRMWARE USING A BASEBOARD MANAGEMENT CONTROLLER

FIELD OF THE DISCLOSURE

This disclosure generally relates to information handling systems, and more particularly relates to providing a root of trust using a baseboard management controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

SUMMARY

A method may include storing basic input/output system (BIOS) firmware instructions at a first flash memory device included at an information handling system. BIOS data is stored at a second flash memory device. A baseboard management controller validates instructions included at an initial boot block of the BIOS firmware.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
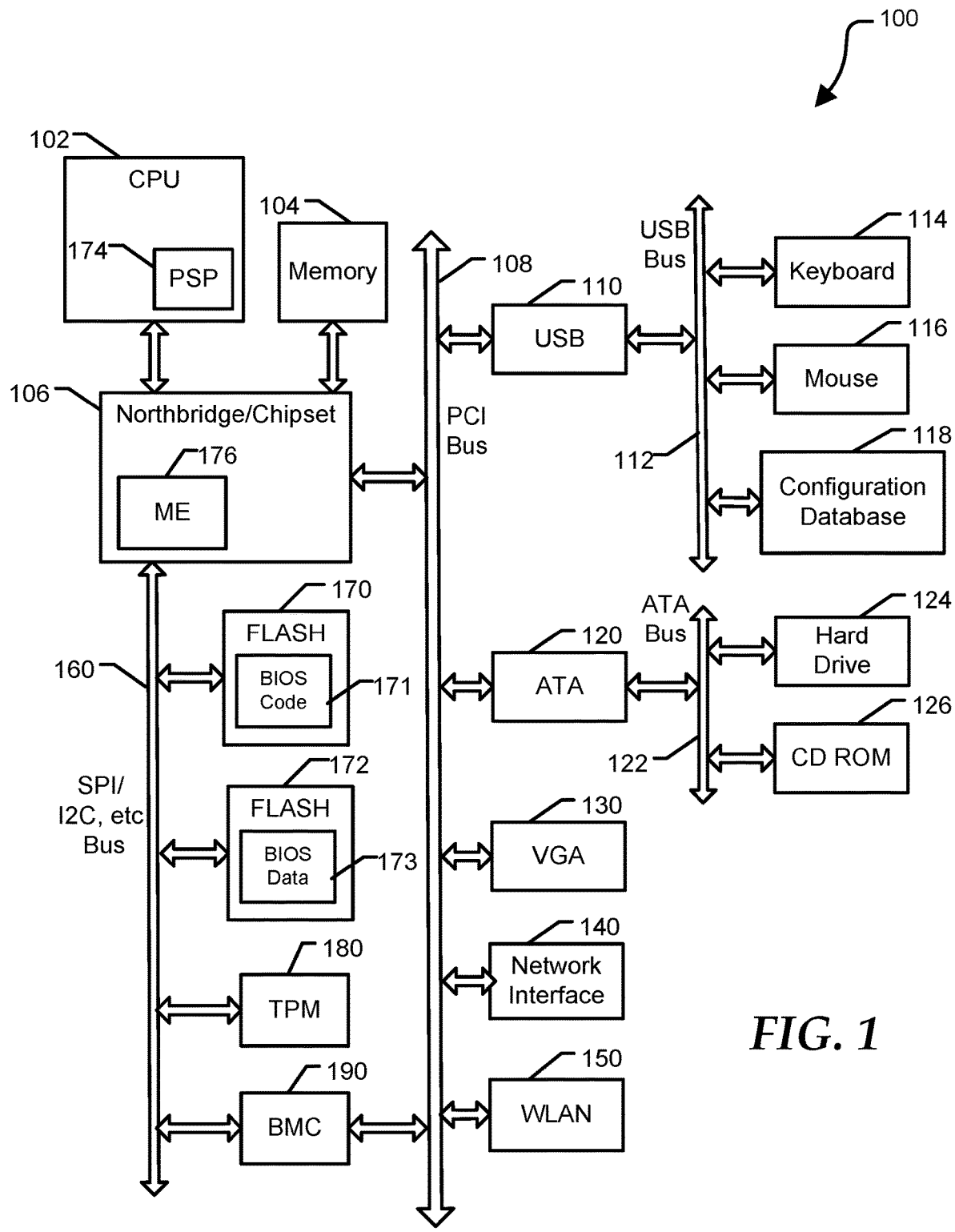
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Information handling systems typically utilize a collection of firmware that is configured to initialize individual subsystems and to ultimately launch an operating system. Firmware included at an information handling system is often referred to as a basic input/output system (BIOS). Today, much of the industry has incorporated a firmware architecture specification know as the Unified Extensible Firmware Interface (UEFI). While the UEFI specification has standardized many aspects of system initialization, the earliest steps in the hardware initialization process may be proprietary to individual equipment manufacturers and further specific to the particular manufacturer of the central processing unit (CPU). For example, the ubiquitous x86 processors provided by Intel Corporation and by Advanced Micro Devices (AMD) employ different early-initialization architectures.

Common to most firmware and system initialization architectures is the concept of root of trust. At a most general level, the root of trust relates to software processes and/or hardware devices that ensure that firmware and other software necessary for operation of an information handling system is operating as expected. The important aspect for a root of trust is to be sure that the initial code is what the manufacturer intended, before the code is executed. When the information handling system starts, the root of trust can execute self-tests to validate the first piece of code in the chain of trust. At the present time, AMD utilizes a platform security processor (PSP) that is integrated on the central processing unit to provide an initial root of trust, while Intel provides this function using a management engine (ME) that is integrated on a chipset device. The PSP and the ME are both configured to validate initial firmware at a BIOS image, herein referred to as an initial boot block. Each of these architectures poses unique security considerations. Furthermore, original equipment manufacturers (OEMs) may have difficulty integrating proprietary functionality within the confines of these divergent initialization architectures.

As disclosed herein, a baseboard management controller (BMC) is configured to provide a root of trust and provide greater flexibility to the OEM to implement proprietary security and system functionality. In particular, the BMC can be configured to validate the initial boot block, and optionally other BIOS firmware, at the beginning of the BIOS initialization process. In addition, the BMC can be configured to validate and update the BIOS firmware during runtime, after control of the information handling system has been turned over to an operating system. To facilitate these runtime capabilities, firmware instructions and firmware data are separated into respective flash memory devices. Accordingly, the BMC can access and manipulate information stored at the flash device associated with firmware code while the operating system is free to concurrently access the flash device associated with firmware data.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a first flash memory device 170 for storing BIOS code 171, a second flash memory device 172 for storing BIOS data 173, a trusted platform module (TPM) 180, and a baseboard management controller (BMC) 190. BMC 190 can be referred to as a service processor, and embedded controller, and the like. Flash memory device 170 can be referred to as a SPI flash device, BIOS SPI, and the like. BMC 190 is configured to provide out-of-band access to devices at information handling system 100. As used herein, out-of-band access herein refers to operations performed without support of CPU 102, such as prior to execution of BIOS code 171 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors, and can be included at chipset 106.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 171 can be referred to as a firmware image, and the term BIOS is herein used interchangeably with the term firmware image, or simply firmware. BIOS code 171 includes instructions executable by CPU 102 and PSP 174 to initialize and test the hardware components of system 100, and to load a boot loader or an operating system (OS) from a mass storage device. BIOS code 171 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS code 171 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

BIOS code 171 is said to be immutable due to the fact that the code remains static during normal operation of information handling system 100. BIOS code 171 is typically modified only during a firmware update procedure. In an embodiment, flash memory device 170 can be configured to store a limited amount of mutable information, for example information associated with ME 176, information associated with an embedded network interface controller, a flash descriptor, and the like. BIOS data 173 can include BIOS setup configuration option values, so-called personality modules, and the like. One or more partitions of BIOS data 173 may be referred to as NVRAM, which is not to be confused with the use of the same term to describe a flash memory device. BIOS data 173 is generally mutable during operation of information handling system 100, for example via UEFI variable services, NVRAM attribute accesses, access control item (ACI) staged accesses, and the like. By segregating BIOS code 171 to flash device 170 and BIOS data 173 to flash device 172, runtime processes can maintain uninterrupted access to BIOS data 173 while BMC 190 can have concurrent access to BIOS code 171.

Figure 2:
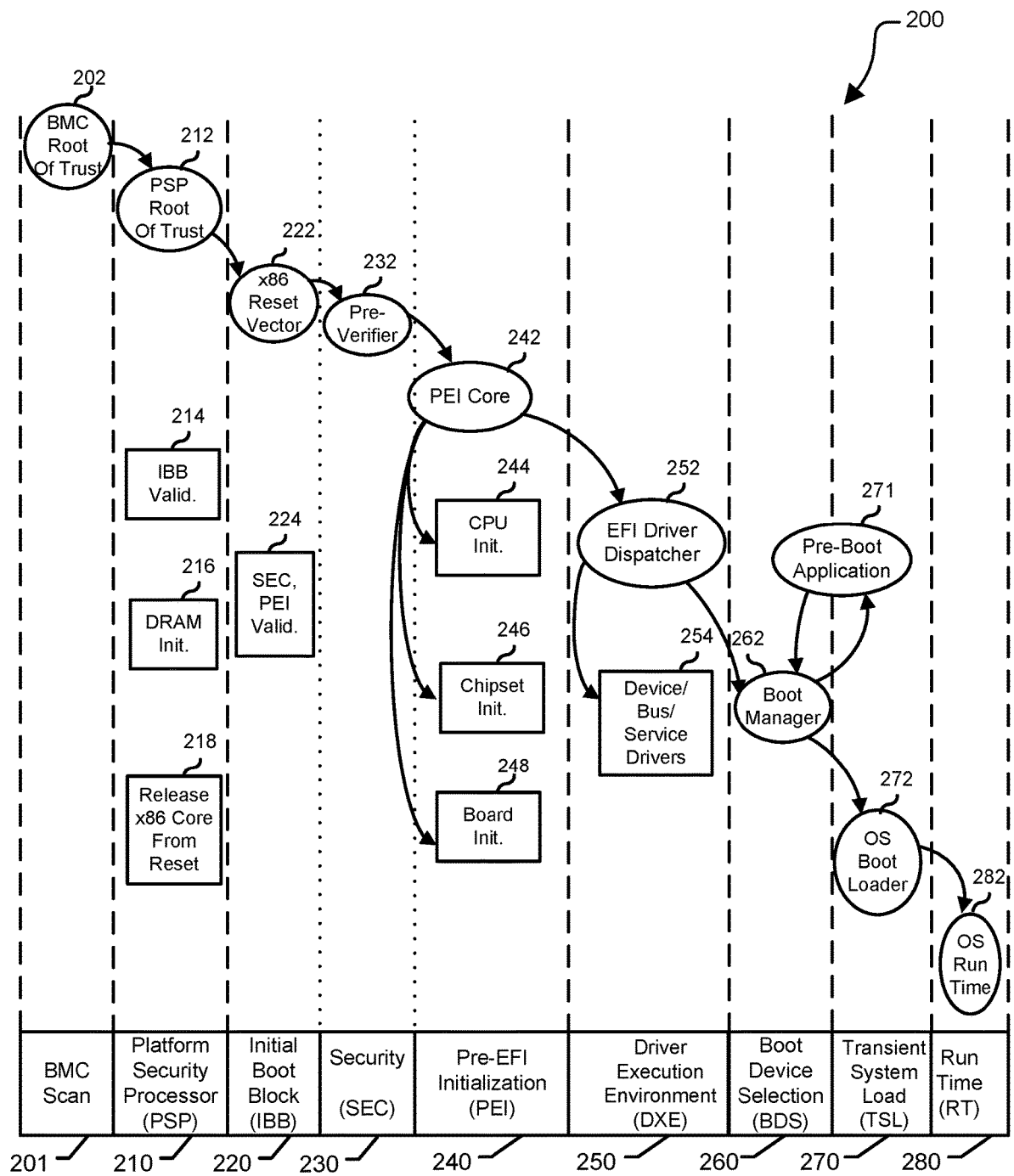
FIG. 2 is a phase diagram illustrating initialization of the information handling system of FIG. 1 according to a specific embodiment of the present disclosure.

FIG. 2 shows an initialization phase diagram 200 for an information handling system according to a specific embodiment of the present disclosure. Phase diagram 200 includes a BMC phase 202, a PSP phase 210, an initial boot block (IBB) phase 220, a security phase (SEC) 230, a pre-EFI initialization phase (PEI) 240, a driver execution environment phase (DXE) 250, a boot device selection phase (BDS) 260, a transient system load phase (TSL) 270, and a run time phase (RT) 280. The number of stages of the boot process and specific operations that occur during these earliest stages of the boot process can vary from one equipment manufacturer to another. As described below, BMC phase 202 provides a root of trust, augmenting or substantially replacing the tasks typically performed by PSP 174 or ME 176. In an embodiment, BMC 190 is configured to validate one or more portions of BIOS code 171 prior to passing control to PSP 174 or to ME 176.

PSP 174, or alternatively ME 176, is configured to validate an IBB image stored at flash memory device 170 before releasing the x86 processor from reset. IBB phase 220 corresponds to the first execution of BIOS code 171 instructions by an x86 processor core included at CPU 102. In an embodiment, IBB phase 220 is responsible for validating BIOS instructions associated with SEC phase 230 and PEI phase 240. In other embodiments, functionality provided during the SEC 230 and PEI 240 phases can be included in IBB phase 220. SEC phase 230 is configured to set up a pre-verifier 232. Pre-verifier 232 can handle restart events on the information handling system, and temporarily may allocate a portion of memory for use during the other boot phases. In the case of information handling systems based on x86 processors provided by the Intel Corporation, SEC 230 passes execution to PEI 240 which initializes system memory 104 for information handling system 100. PEI 240 can include PEI core code 242, which oversees CPU initialization 244, chipset initialization 246, and board resource initialization 248. PEI 240 passes execution to DXE 250 which performs device specific initializations for the information handling system. In particular, DXE 250 executes an EFI driver dispatcher 252 that operates to load device, bus, and service drivers 254.

DXE 250 passes execution to BDS 260 and executes a boot manager 262 which identifies a boot target, and passes execution to TSL 270. TSL 270 can launch an OS boot loader 272, which loads the operating system and passes execution to the OS runtime environment 282 at RT 280. RT 280 can remain active until system 100 is reset, an Advanced Configuration and Power Interface (ACPI) event is initiated, and the like, at which time execution is passed to a phase of operation sometimes referred to as after life, which refers to times that the firmware takes control back from the primary OS, such as when system 100 enters a low-power mode of operation. Alternatively, TSL 270 can launch one or more pre-boot applications 271. Upon completion of the pre-boot application 271, boot manager 262 can initiate OS boot loader 272, which loads the primary operating system.

During the boot process, instructions executed during a particular phase of the boot process can validate firmware associated with one or more subsequent phases. In the event that a block of firmware fails authentication, a BIOS recovery procedure can be initiated to replace invalid firmware with uncorrupted firmware. Techniques disclosed herein provide mechanisms to validate IBB firmware prior to turning over control to either PSP 174 or ME 176. In particular, BMC 190 is configured to validate IBB firmware, and optionally other portions of BIOS code 171, and thereby provide an initial root of trust for system 100.

Figure 3:
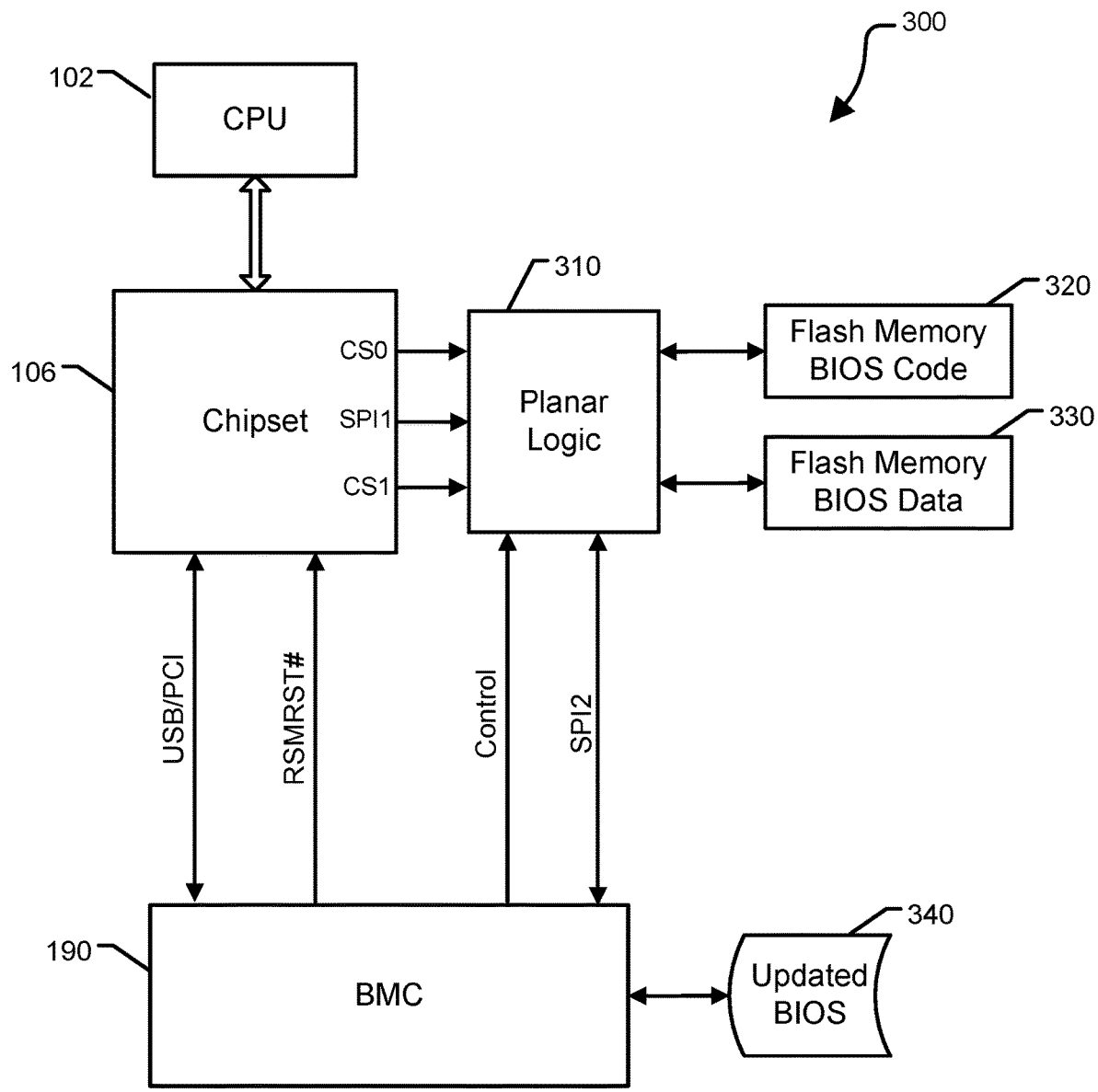
FIG. 3 is a block diagram of an information handling system according to a specific embodiment of the present disclosure.

FIG. 3 shows a block diagram of an information handling system 300 according to a specific embodiment of the present disclosure. System 300 includes CPU 102, chipset 106, BMC 190, planar logic 310, a flash memory 320 to store BIOS code, and a flash memory 330 to store BIOS data. These components are typically installed on a printed circuit board known as a motherboard, also known as a mainboard, system board, planar board, and the like. In an embodiment, BMC 190 can be configured to receive updated BIOS 340 to replace BIOS code stored at flash memory 320. Planar logic 310 represents circuitry that can be included at the motherboard and that is configured to provide access to flash memory devices 320 and 330 by chipset 106 and BMC 190. Chipset 106 can provide two chip select signals, CS0 and CS1. In an embodiment, flash memory device 320 can be associated with CS0 and flash memory device 330 can be associated with CS1. BMC 190 can be coupled to other circuitry at system 300 using one or more busses, for example USB or PCI. BMC 190 is configured to generate a signal RSMMRST# (resume reset) to control power-on-reset events, as described below. BMC 190 further provides one or more control signals to configure operation of planar logic 310. In a particular embodiment, planar logic 310 can provide a multiplexor function to selectively couple chipset 106 and BMC 190 to flash memory device 320. For example, BMC 190 can configure planar logic 310 to decouple SPI bus SPI1 that provides access by chipset 106 to flash memory device 320, and to couple SPI bus SPI2 that provides access by BMC 190 to flash memory device 320.

During operation, BMC 190 can sequester access to BIOS code at flash memory device 320 for the purpose of validating firmware included at device 320, or for the purpose of updating code stored at device 320. When BMC 190 has access to BIOS code stored at flash device 320, chipset 106 can retain access to BIOS data stored at flash device 330. Once BMC 190 has completed the validation or updating procedure, BMC 190 can configure planar logic 310 to return access of BIOS code to chipset 106. The operation of system 300 can better understood with reference to FIGS. 4-8.

Figure 4:
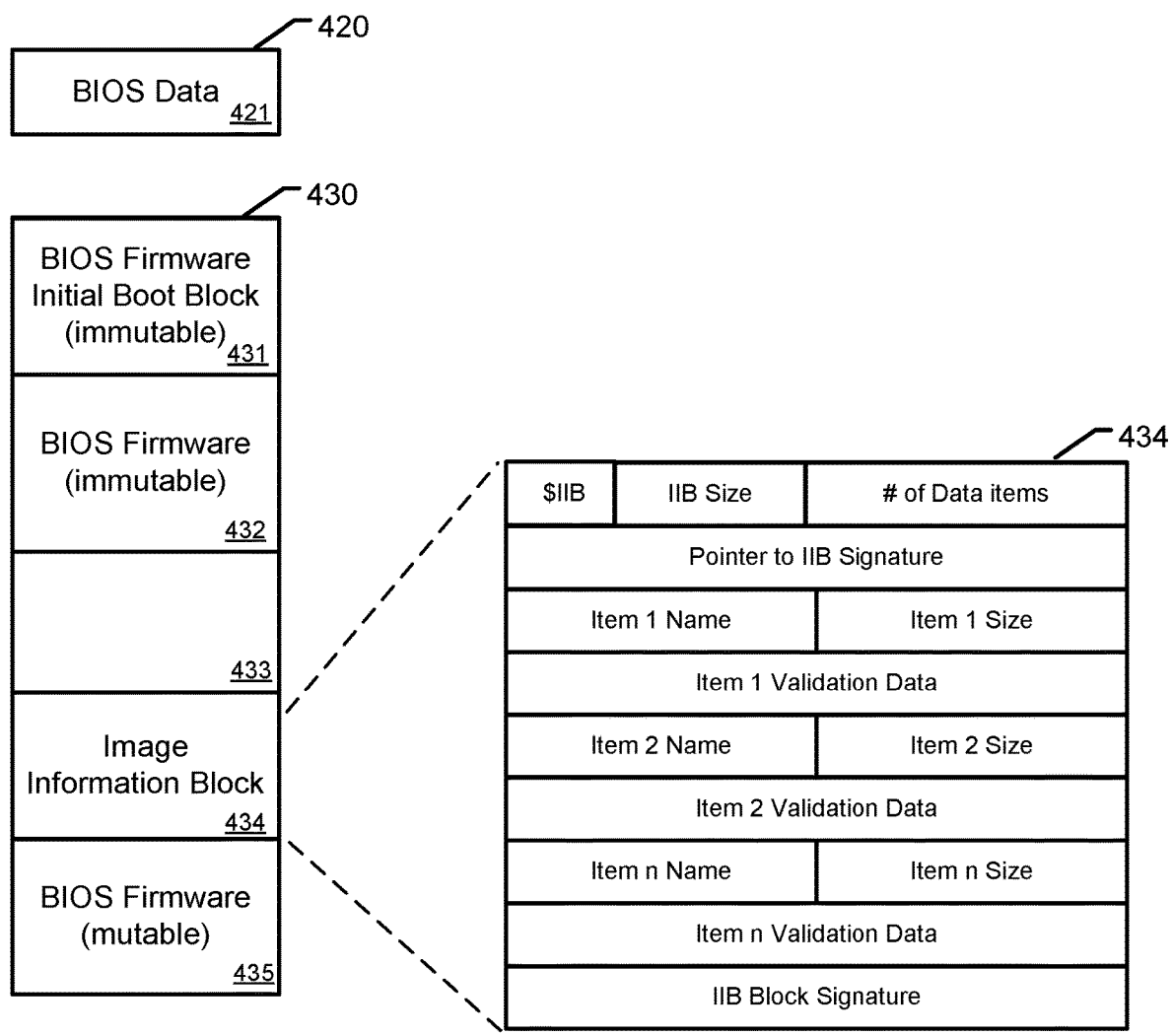
FIG. 4 is a block diagram illustrating flash memory devices of FIG. 3 according to a specific embodiment of the present disclosure.

FIG. 4 shows flash memory devices of FIG. 3 according to a specific embodiment of the present disclosure. FIG. 4 includes a first flash memory device 420 for storing BIOS data 421 and a second flash memory device 430 for storing BIOS code. Flash memory device 430 can include numerous logical or physical partitions, however for clarity, only a few such partitions are illustrated. In particular, flash device 430 includes immutable BIOS firmware 431, immutable BIOS firmware 432, empty space 433, and mutable BIOS firmware 435. Flash device 430 also includes an image information block (IIB) 434. IIB 434 can be accessed by BMC 190 and provides a map of specific code blocks included at flash device 430 that can be individually validated. IIB 434 includes a header, the header identifying the IIB, specifying a size of the IIB partition, specifying a number of individual code blocks enumerated at the IIB, and a pointer to an IIB block signature. For each of the enumerated code blocks, IIB 434 includes a name of a code block (Item 1 Name, Item 2 Name, and Item n Name), a size of the of the code block (Item 1 Size, Item 2 Size, and Item n Size), and validation data (Item 1 Validation Data, Item 2 Validation Data, and Item 3 Validation Data).

During operation, BMC 190 can access IIB 434 in order to identify firmware blocks that can be validated by BMC 190. The contents of IIB 434 are first authenticated using the block signature provided at IIB 434. For example, IIB 434 can be prepared during build time of BIOS code 171 and signed using an OEM private key. BMC 190 can proceed to validate each of the identified blocks using the corresponding validation data. For example, Item 1 may correspond to an initial boot block of BIOS code 171 that is stored at BIOS firmware block 431. In one embodiment, the validation procedure can include generating a hash based on firmware included at the identified block, and comparing the generated hash to the corresponding validation data included at IIB 434. If the generated hash matches the validation data provided by IIB 434, code included at the block may be deemed valid. If the generated hash does not match the validation data, the code included at the block may be deemed compromised, perhaps due to a malicious activity, and a remediation procedure can be invoked. For example, remediation can include initiating a BIOS recovery operation whereby BMC 190 can install a new BIOS image at flash memory device 170. In addition, BMC 190 can generate a log entry identifying the validation failure and information documenting a remediation procedure, if applicable.

Figure 5:
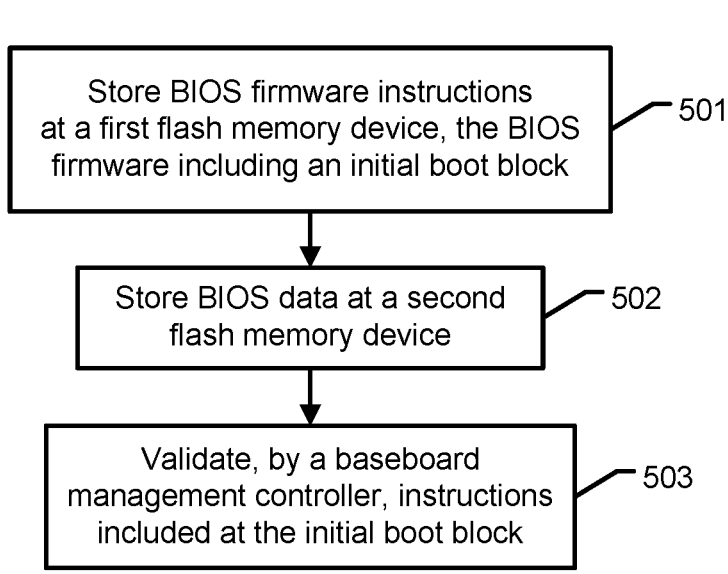
FIG. 5 is a flow diagram illustrating a method for validating firmware code using a baseboard management controller according to a specific embodiment of the present disclosure.

FIG. 5 shows a method 500 for validating firmware code using a BMC according to a specific embodiment of the present disclosure. Method 500 begins at block 501 where BIOS firmware instructions, including instructions associated with an initial boot block, are stored at a first flash memory device. For example, during the build time of information handling system 100 or during a subsequent update of the BIOS image at system 100, BIOS code 171 can be stored at flash memory device 170. Method 500 continues at block 502 where BIOS data is stored at a second flash memory device. For example, BIOS data 173 can be stored at flash memory device 172. Method 500 completes at block 503 where a baseboard management controller validates instructions included at the initial boot block. For example, BMC 190 can retrieve image information block 434 that is stored at flash memory device 170, locate initial boot block 431 at flash memory device 170 based on information provided by the image information block 434, and validate the instructions included at initial boot block 434 based on the validation data provided by image information block 434. The validation can take place in response to a power-on-reset event at information handling system 100, or it may take place during runtime. In particular, BMC 190 can access flash memory device 170 after an operating system as assumed control of system 100, while runtime processes maintain access to BIOS data stored at flash memory device 172. While validation can be limited to instructions included at initial boot block 431, one of skill will appreciate that additional blocks of code can be validated based on items identified at IIB 434.

Figure 6:
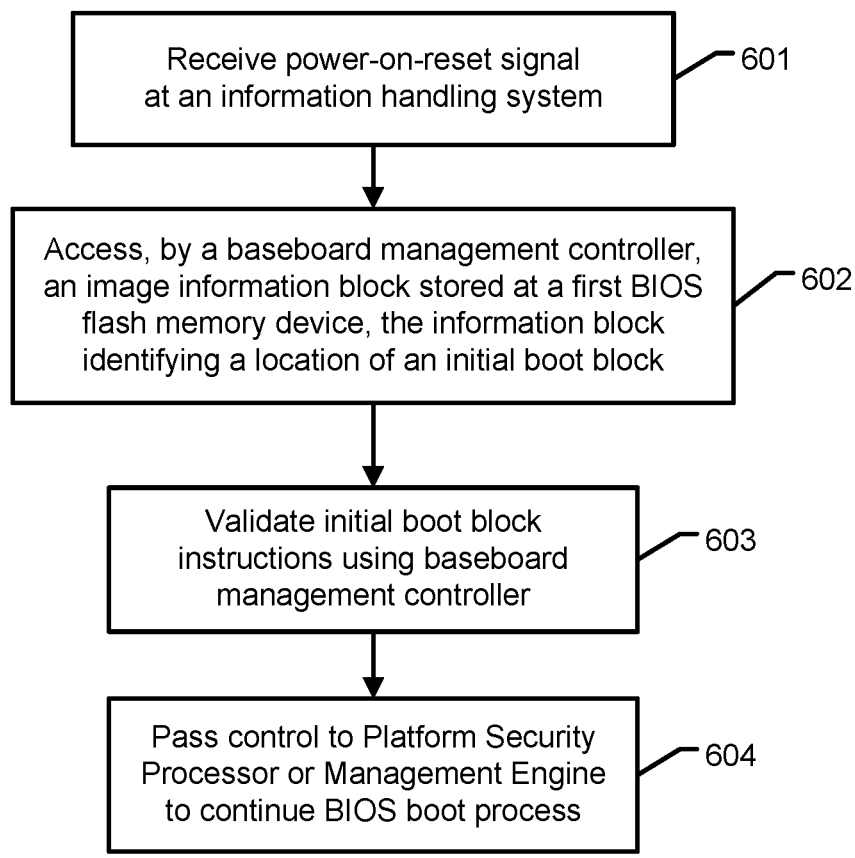
FIG. 6 is a flow diagram illustrating a method for validating firmware code during initialization of an information handling system according to a specific embodiment of the present disclosure.

FIG. 6 shows a method 600 for validating firmware code during initialization of an information handling system according to a specific embodiment of the present disclosure. Method 600 begins at block 601 where a power-on-reset signal is received at an information handling system. For example, a user may press a power button or a reset button provided at information handling system 100. At block 602, a baseboard management controller accesses an image information block stored at a first BIOS flash memory device, the information block identifying a location of an initial boot block. Method 600 continues at block 603 where the BMC validates instructions at the initial boot block. For example, image information block 434 can identify initial boot block 431 and provide validation data that can be used to authenticate instructions included at initial boot block 431. Method 600 completes at block 604 where the baseboard management controller passes control to a platform security processor or management engine, which continue the boot process.

Figure 7:
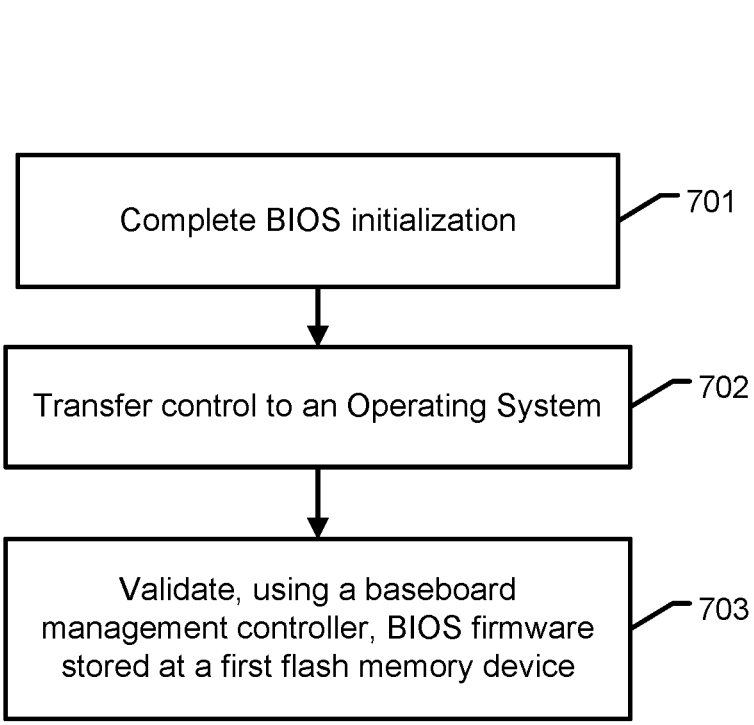
FIG. 7 is a flow diagram illustrating a method for validating firmware code during runtime of an information handling system according to a specific embodiment of the present disclosure.

FIG. 7 shows a method 700 for validating firmware code during runtime of an information handling system according to a specific embodiment of the present disclosure. Method 700 begins at block 701 where BIOS initialization is completed at an information handling system. At block 702, control of the information handling system is transferred to an operating system. In an embodiment, the BIOS firmware can provide an end-of-post code to BMC 190 indicating that BIOS initialization has completed. At this point, the information handling system can begin operating normally, for example executing user programs. Method 700 completes at block 703 where a baseboard management controller validates BIOS firmware stored at a first flash memory device. For example, BMC 190 can retrieve image information block 434 that is stored at flash memory device 170, locate initial boot block 431 based on information provided by IIB 434, and validate the instructions included at initial boot block 431 based on the validation data provided by IIB 434. As described above, BMC 190 can access flash memory device 320 by issuing control signals to planar logic 310. If the validation procedure indicates a BIOS corruption, BMC 190 can inform a user or administrator of information handling system 100 of the issue, and optionally invoke a BIOS recovery operation. In an embodiment, BMC 190 can place ME 176 in a recovery mode during the time that BMC 190 has access to flash device 320 so that ME 176 does not attempt to access flash device 320.

Figure 8:
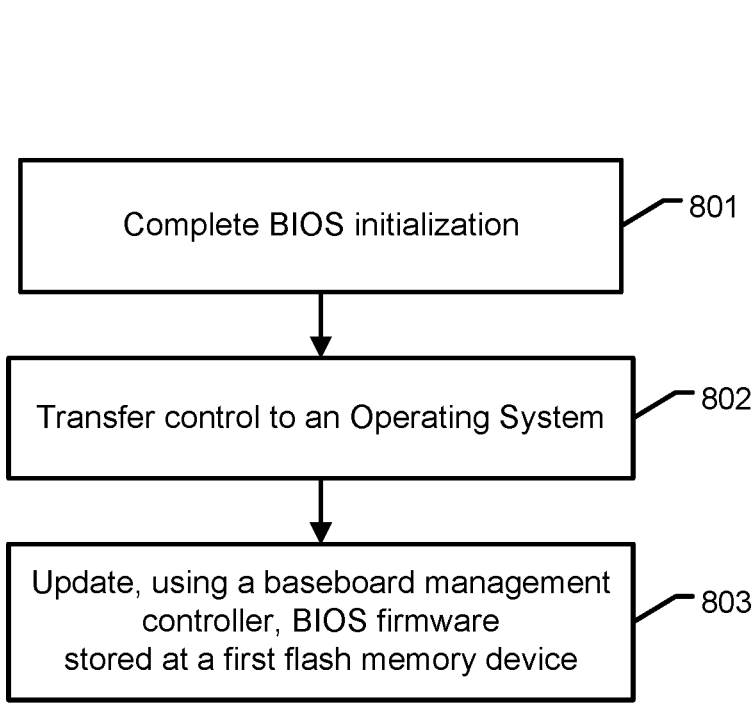
FIG. 8 is a flow diagram illustrating a method for updating firmware code during runtime of an information handling system according to a specific embodiment of the present disclosure.

FIG. 8 shows a method 800 for updating firmware code during runtime of an information handling system according to a specific embodiment of the present disclosure. Updating firmware code during runtime is herein referred to as a live update. Method 800 begins at block 801 where BIOS initialization is completed at an information handling system. At block 802, control of the information handling system is transferred to an operating system. Method 800 completes at block 803 where a baseboard management controller updates the BIOS firmware stored at a first flash memory device. As described above, BMC 190 can place ME 176 in a recovery mode during the time that BMC 190 has access to flash device 320 so that ME 176 does not attempt to access flash device 320. In the prior art, where a single flash memory device is used to store both BIOS code and BIOS data, configuration settings are typically preserved when a BIOS update is performed, so as to ensure that users of the information handling system do not lose their current preference setting as a result of the BIOS update. Under some circumstances, the configuration settings may need to be reset to a default state. In the split-flash design disclosed herein, BMC 190 can set a flag indicating a wipe-clean is required. If the flag is set, the BIOS can clear the contents of flash memory device 330 during a first boot after the live update, and rebuild the BIOS data information stored at device 330 so that the BIOS data is consistent with the updated firmware configuration options.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
storing basic input/output system (BIOS) firmware instructions at a first flash memory device included at an information handling system, the BIOS firmware including an initial boot block;
storing BIOS data at a second flash memory device; and
validating, by a baseboard management controller (BMC), instructions included at the initial boot block, the validating while the information handling system is under control of an operating system.

2. The method of claim 1, wherein the second flash memory device is accessible to runtime instructions concurrently with the validating.

3. The method of claim 1, further comprising:
replacing, by the BMC, the BIOS firmware instructions with updated firmware while the information handling system is under control of an operating system.

4. The method of claim 1, wherein the validating comprises validating the instructions before executing the instructions at the initial boot block.

5. The method of claim 1, wherein the first flash memory device includes an image information block (BIB), the image information block identifying a first firmware code block and providing validation information corresponding to the first code block.

6. The method of claim 1, wherein:
the first flash memory devices is coupled to a first chip select signal provided by a platform controller hub (PCH) and by the BMC; and
the second flash memory device is coupled to a second chip select signal provided by the PCH.

7. The method of claim 1, wherein the BIOS data includes system configuration settings.

8. The method of claim 5, wherein the image information block includes a digital signature for validating information included at the image information block.

9. An information handling system comprising:
a central processing unit;
a first flash memory device to store basic input/output system (BIOS) firmware instructions, the firmware including an initial boot block;
a second flash memory device to store BIOS data; and
a baseboard management controller (BMC) configured to validate instructions included at the initial boot block while the information handling system is under control of an operating system.

10. The information handling system of claim 9, wherein the second flash memory device is accessible to runtime instructions concurrently with the validating.

11. The information handling system of claim 9, wherein the BMC is further configured to replace the BIOS firmware with updated firmware while the information handling system is under control of an operating system.

12. The information handling system of claim 9, wherein the BMC is further configured to validate the instructions before executing the instructions at the initial boot block.

13. The information handling system of claim 9, wherein the first flash memory device includes an image information block, the image information block identifying a first firmware code block and providing validation information corresponding to the first code block.

14. The information handling system of claim 9, wherein:
the first flash memory devices is coupled to a first chip select signal provided by a platform controller hub (PCH) and by the BMC; and
the second flash memory device is coupled to a second chip select signal provided by the PCH.

15. The information handling system of claim 9, further comprising a multiplexor function to selectively couple one of the PCH and the BMC to have access to the first flash memory device.

16. A method comprising:
storing immutable basic input/output system (BIOS) firmware instructions at a first flash memory device included at an information handling system;
storing an image information block at the first flash memory device, the image information block identifying a first firmware code block and providing validation information corresponding to the first firmware code block; and
validating the immutable BIOS instructions using a baseboard management controller based on the validation information while the information handling system is under control of an operating system.

17. The method of claim 16, further comprising:
storing BIOS data at a second flash memory device, the BIOS data accessible to runtime instructions concurrent with the validating.

18. The method of claim 16, further comprising:
updating firmware at the first flash memory device while the information handling system is under control of an operating system.

* * * * *